US011396301B2

(12) United States Patent
Miyamoto et al.

(10) Patent No.: US 11,396,301 B2
(45) Date of Patent: Jul. 26, 2022

(54) VEHICLE CONTROL APPARATUS, VEHICLE CONTROL METHOD, AND NON-TRANSITORY COMPUTER-READABLE STORAGE MEDIUM STORING PROGRAM

(71) Applicant: HONDA MOTOR CO., LTD., Tokyo (JP)

(72) Inventors: Kouhei Miyamoto, Tokyo (JP); Jun Ochida, Wako (JP); Seiji Watanabe, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/149,896

(22) Filed: Jan. 15, 2021

(65) Prior Publication Data
US 2021/0237749 A1    Aug. 5, 2021

(30) Foreign Application Priority Data

Jan. 30, 2020    (JP) .............................. JP2020-013785

(51) Int. Cl.
*B60W 60/00*    (2020.01)
*B60W 50/023*    (2012.01)
(Continued)

(52) U.S. Cl.
CPC ........ *B60W 50/023* (2013.01); *B60W 50/035* (2013.01); *B60W 50/045* (2013.01); *B60W 2050/0292* (2013.01); *B60W 2556/10* (2020.02)

(58) Field of Classification Search
CPC ............. B60W 50/045; B60W 50/035; B60W 50/023; B60W 2556/10;
(Continued)

(56) References Cited

U.S. PATENT DOCUMENTS 6,463,373 B2    10/2002    Suganuma et al.
7,467,029 B2 *  12/2008    Forest ................. B60W 50/045
                                                340/508
(Continued)

FOREIGN PATENT DOCUMENTS

CN        1790201 B  *  5/2010  .......... B60W 50/029
CN      105358396 B  *  6/2018  ................ B60T 7/22
(Continued)

OTHER PUBLICATIONS

B. Thornton, T. Ura, Y. Nose and S. Turnock, "Zero-G Class Underwater Robots: Unrestricted Attitude Control Using Control Moment Gyros," in IEEE Journal of Oceanic Engineering, vol. 32, No. 3, pp. 565-583, Jul. 2007, doi: 10.1109/JOE.2007.899274 (Year: 2007).*
(Continued)

*Primary Examiner* — Cuong H Nguyen
(74) *Attorney, Agent, or Firm* — Thomas | Horstemeyer, LLP

(57) ABSTRACT

A vehicle control apparatus comprises a first travel control unit and a second travel control unit that are configured to perform vehicle travel control by device control. The first travel control unit includes an instruction unit configured to instruct the second travel control unit to execute alternative control, a stop unit configured to stop the device control if execution of the alternative control was instructed by the instruction unit, a reception unit configured to receive information regarding an execution status of the alternative control from the second travel control unit, and a determination unit configured to determine whether the stopping of the device control by the stop unit is to be cancelled, based on the information regarding the execution status of the alternative control that was received by the reception unit.

9 Claims, 11 Drawing Sheets

(51) Int. Cl.
*B60W 50/04* (2006.01)
*B60W 50/035* (2012.01)
*B60W 50/029* (2012.01)

(58) Field of Classification Search
CPC . B60W 2050/0295; B60W 2050/0018; B60W 60/00; B60W 2050/029; B60W 2050/0292; B60W 50/0098; B62D 15/021
USPC .......................................... 701/23; 340/508
See application file for complete search history.

(56) References Cited

U.S. PATENT DOCUMENTS

| | | | | |
|---|---|---|---|---|
| 9,141,109 | B1* | 9/2015 | Kamata | G08B 21/02 |
| 9,682,622 | B2* | 6/2017 | Kim | B60K 28/066 |
| 9,889,839 | B2* | 2/2018 | Iwagami | B60W 50/035 |
| 10,239,540 | B2* | 3/2019 | Miura | B60W 50/06 |
| 11,014,558 | B2* | 5/2021 | Horii | B60W 50/023 |
| 2002/0099487 | A1 | 7/2002 | Suganuma et al. | |
| 2006/0126256 | A1* | 6/2006 | Forest | B60W 50/045 |
| | | | | 361/139 |
| 2012/0062747 | A1* | 3/2012 | Zeng | G06V 20/588 |
| | | | | 348/149 |
| 2015/0266488 | A1* | 9/2015 | Solyom | B60W 10/20 |
| | | | | 701/28 |
| 2017/0316273 | A1* | 11/2017 | Ferguson | G08G 1/096775 |
| 2020/0017117 | A1* | 1/2020 | Milton | G07C 5/0841 |
| 2020/0298871 | A1 | 9/2020 | Mukai et al. | |
| 2021/0229667 | A1* | 7/2021 | Miyamoto | B62D 15/021 |
| 2022/0126845 | A1* | 4/2022 | Hsu | B60W 50/023 |

FOREIGN PATENT DOCUMENTS

| | | | | |
|---|---|---|---|---|
| CN | 110116752 A | * | 8/2019 | ......... B60R 16/0231 |
| DE | 102005057066 B4 | * | 3/2021 | .......... B60W 50/029 |
| GB | 2590133 A | * | 6/2021 | ............ B60W 30/08 |
| JP | 2002-221075 A | | 8/2002 | |
| JP | 2012-111286 A | | 6/2012 | |
| JP | 2019-055673 A | | 4/2019 | |
| WO | 2019/116870 A1 | | 6/2019 | |

OTHER PUBLICATIONS

Y. Ma, Z. Wang, H. Yang and L. Yang, "Artificial intelligence applications in the development of autonomous vehicles: a survey," in IEEE/CAA Journal of Automatica Sinica, vol. 7, No. 2, pp. 315-329, Mar. 2020, doi: 10.1109/JAS.2020.1003021 (Year: 2020).*

S. B. Cruz, T. E. Abrudan, Z. Xiao, N. Trigoni and J. Barros, "Neighbor-Aided Localization in Vehicular Networks," in IEEE Trans on Intelligent Transportation Syst, vol. 18, No. 10, pp. 2693-2702, Oct. 2017, doi: 10.1109/TITS.2017.2655146 (Year: 2017).*

M. Boari, A. Ciampolini and A. Corradi, "Programming environments for transputer-based architectures," in Proceedings, Advanced Computer Technology, Reliable Systems and Applications, Bologna, Italy, 1991 pp. 94,95,96,97,98,99,100,101,102. doi: 10.1109/CMPEUR.1991.257363 (Year: 1991).*

E. A. Gomez and N. Elliot, "Research Article Measuring Mobile ICT Literacy: Short-Message Performance Assessment in Emergency Response Settings," in IEEE Transactions on Professional Communication, vol. 56, No. 1, pp. 16-32, Mar. 2013, doi: 10.1109/TPC.2012.2208394 (Year: 2013).*

Notice of Grant for Japanese Patent Application No. 2020-013785 dated Nov. 8, 2021.

* cited by examiner

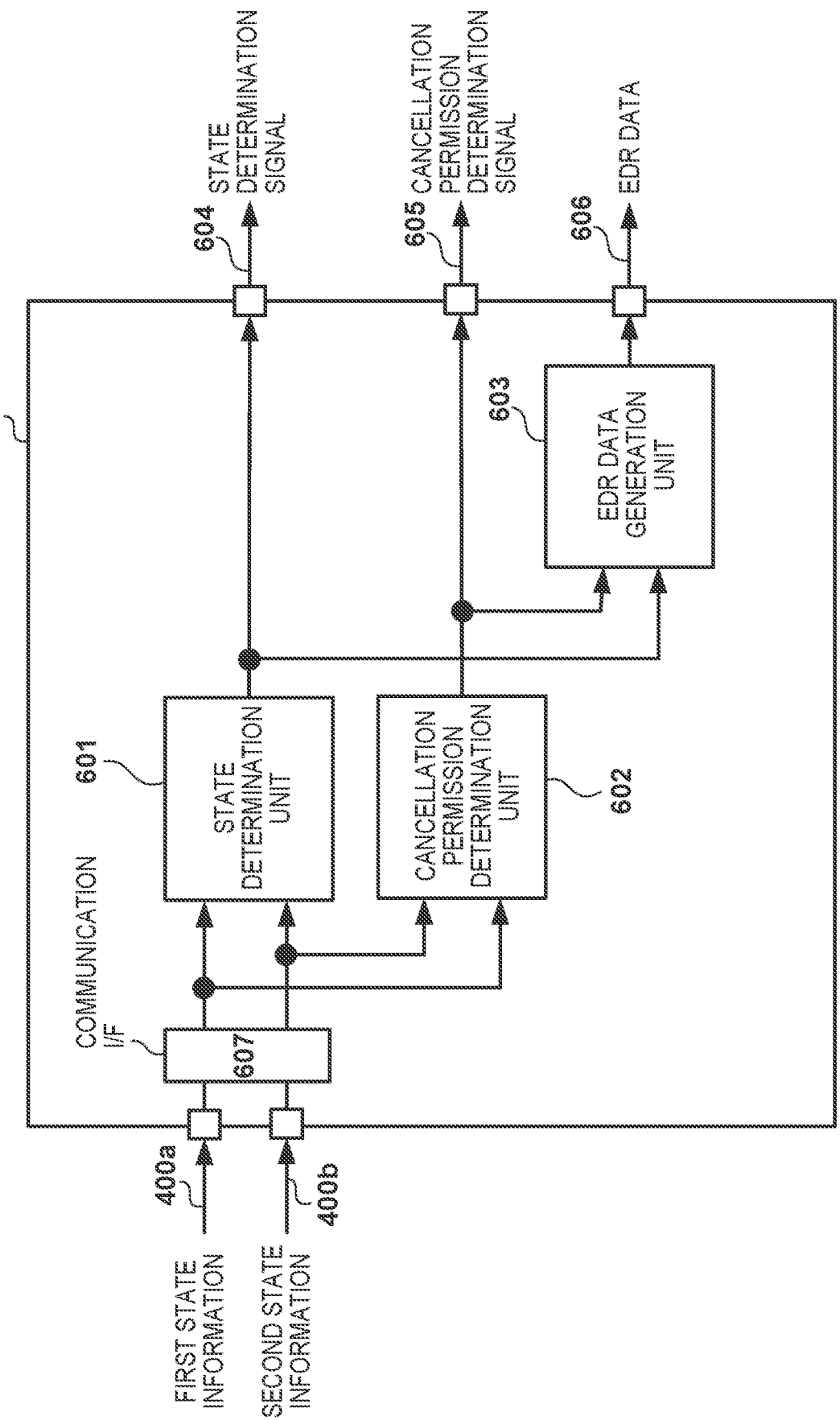

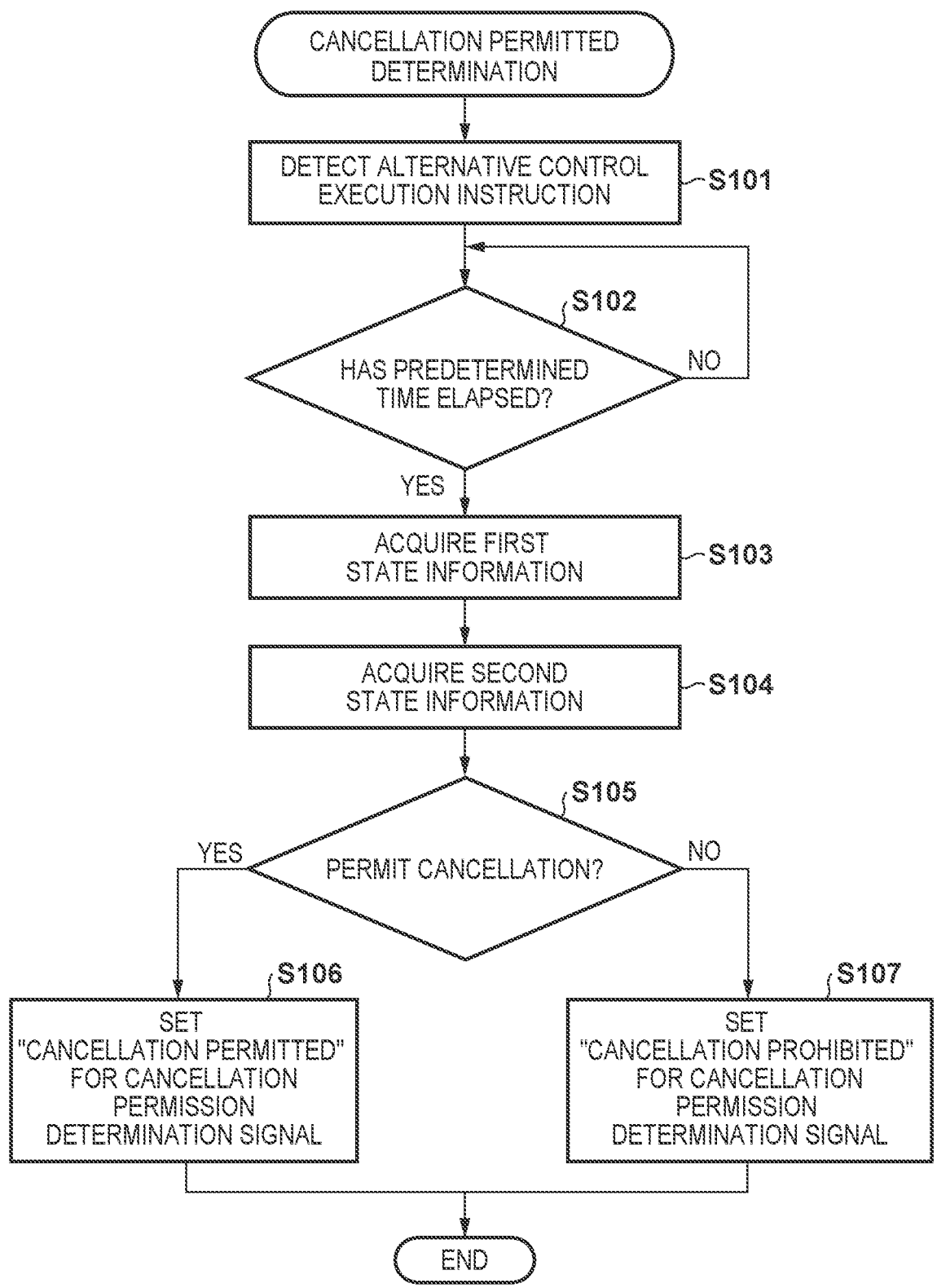

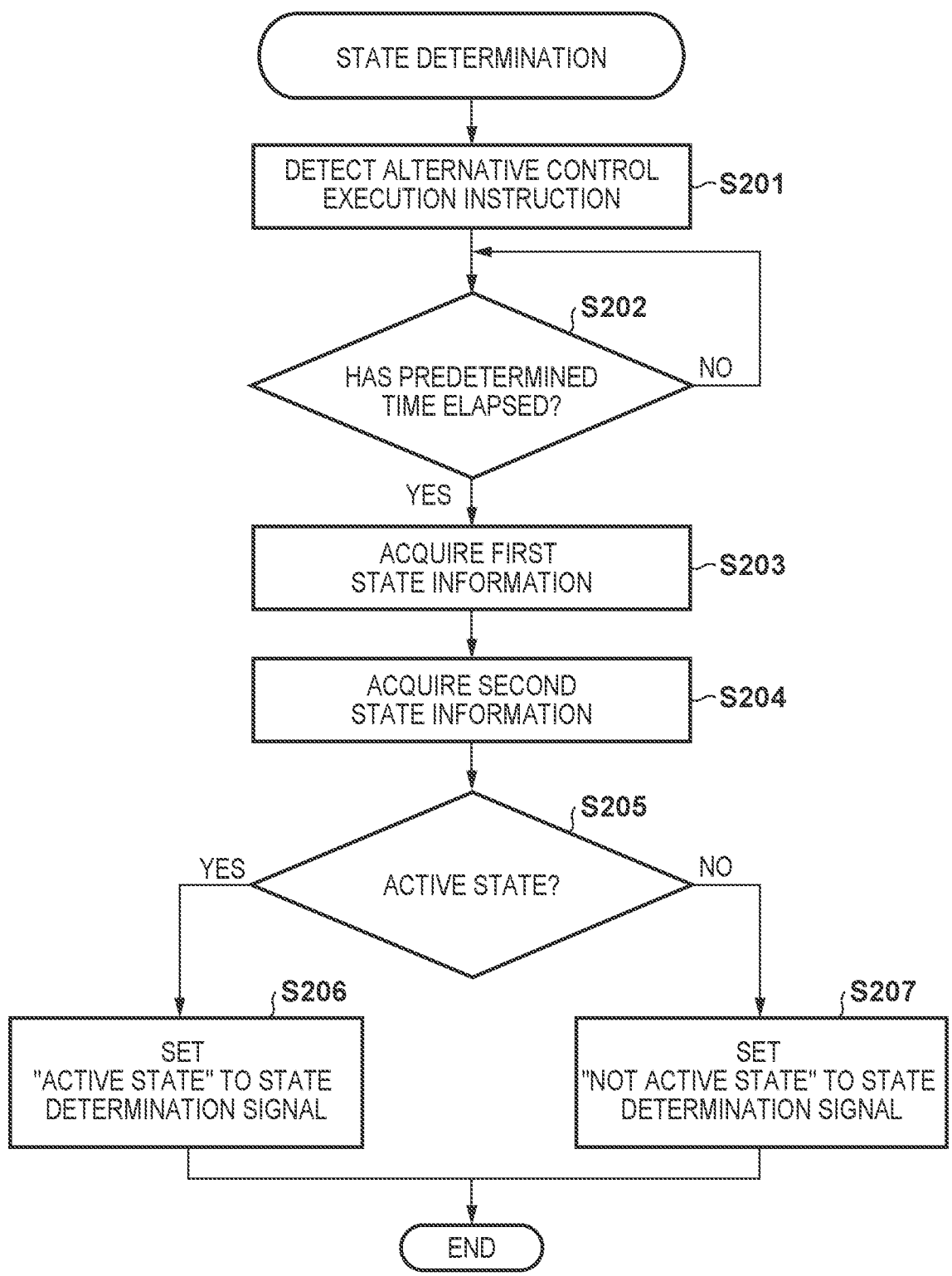

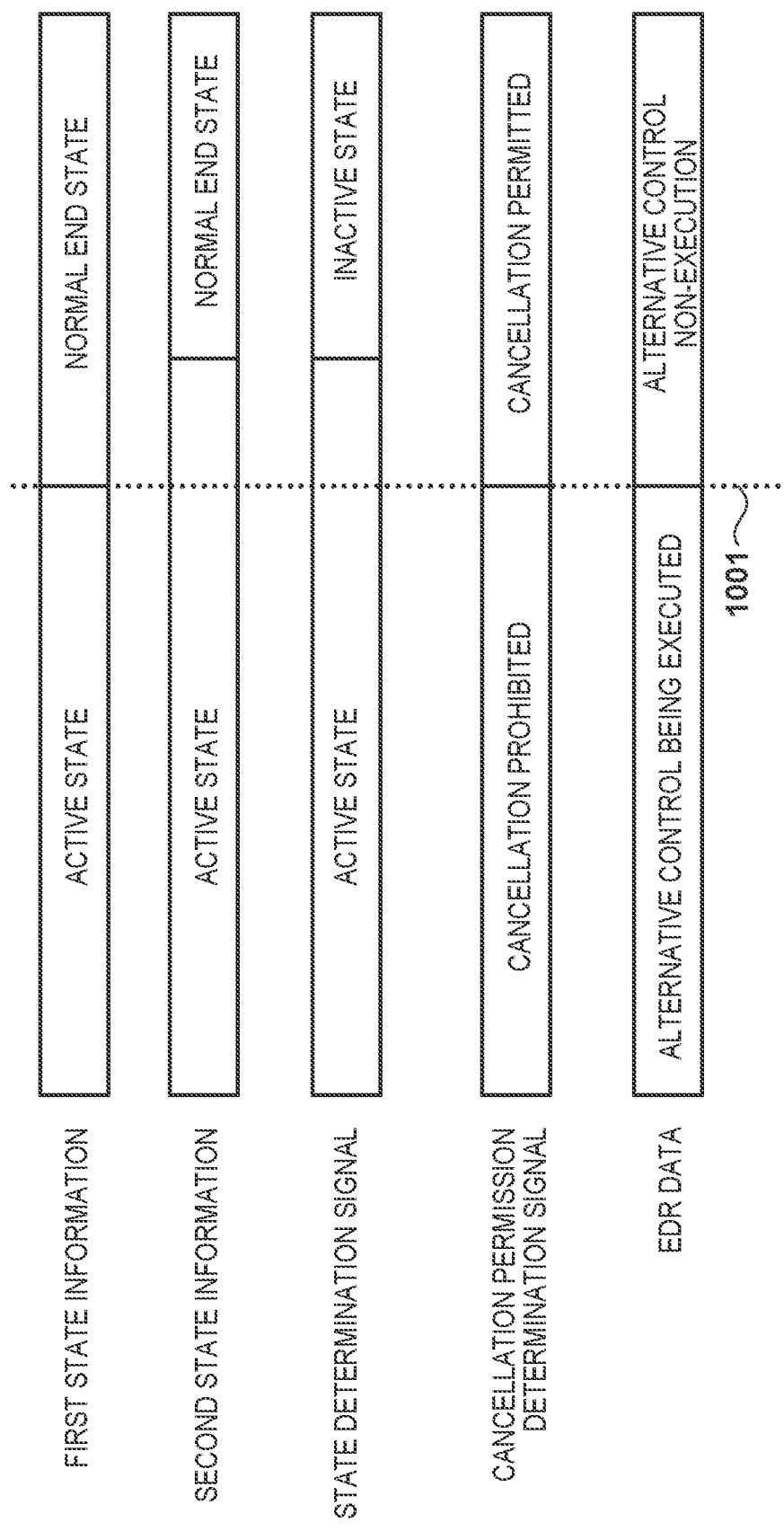

VEHICLE CONTROL APPARATUS, VEHICLE CONTROL METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2020-013785 filed on Jan. 30, 2020, the entire disclosure of which is incorporated herein by reference.

BACKGROUND OF THE INVENTION

Field of the Invention

The present invention relates to a vehicle control apparatus and a vehicle control method for controlling the traveling of a vehicle, as well as a non-transitory computer-readable storage medium that stores a program for the same.

Description of the Related Art

Various technologies have been proposed to realize the automated driving of vehicles. International Publication No. 2019/116870 describes a control system in which if a reduction in the functionality of a vehicle is detected, alternative control is performed by at least either a first travel control unit that performs first travel control on the vehicle and a second travel control unit that performs second travel control on the vehicle.

SUMMARY OF THE INVENTION

The present invention provides a vehicle control apparatus and a vehicle control method for making it possible to make a determination to cancel self-interruption based on the execution status of alternative control, as well as a non-transitory computer-readable storage medium storing a program for the same.

The present invention in its first aspect provides a vehicle control apparatus that includes: a first travel control unit and a second travel control unit that are configured to perform vehicle travel control by device control, wherein the first travel control unit includes an instruction unit configured to instruct the second travel control unit to execute alternative control, a stop unit configured to stop the device control if execution of the alternative control was instructed by the instruction unit, a reception unit configured to receive information regarding an execution status of the alternative control from the second travel control unit, and a determination unit configured to determine whether the stopping of the device control by the stop unit is to be cancelled, based on the information regarding the execution status of the alternative control that was received by the reception unit.

The present invention in its second aspect provides a vehicle control method executed in a vehicle control apparatus that includes a first travel control unit and a second travel control unit that are configured to perform vehicle travel control by device control, the vehicle control method including: the first travel control unit instructing the second travel control unit to execute alternative control; the first travel control unit stopping the device control if execution of the alternative control was instructed; the first travel control unit receiving information regarding an execution status of the alternative control from the second travel control unit; and the first travel control unit determining whether the stopping of the device control is to be cancelled, based on the received information regarding the execution status of the alternative control.

The present invention in its third aspect provides a non-transitory computer-readable storage medium storing a program for causing a vehicle control apparatus, which includes a first travel control unit and a second travel control unit that are configured to perform vehicle travel control by device control, to operate such that: the first travel control unit instructs the second travel control unit to execute alternative control; the first travel control unit stops the device control if execution of the alternative control was instructed; the first travel control unit receives information regarding an execution status of the alternative control from the second travel control unit; and the first travel control unit determines whether the stopping of the device control is to be cancelled, based on the received information regarding the execution status of the alternative control.

According to the present invention, it is possible to make a determination to cancel self-interruption based on the execution status of alternative control.

BRIEF DESCRIPTION OF THE DRAWINGS

FIG. 6 is a block diagram showing a configuration related to state determination and cancellation permission determination.
7A and 7B are diagrams for explaining the timing at which cancellation permission determination is performed.
FIG. 8 is a flowchart showing cancellation permission determination processing.
FIG. 9 is a flowchart showing state determination processing.
FIG. 10 is a diagram for describing transitions of EDR data.

DESCRIPTION OF THE EMBODIMENTS

Figure 1:
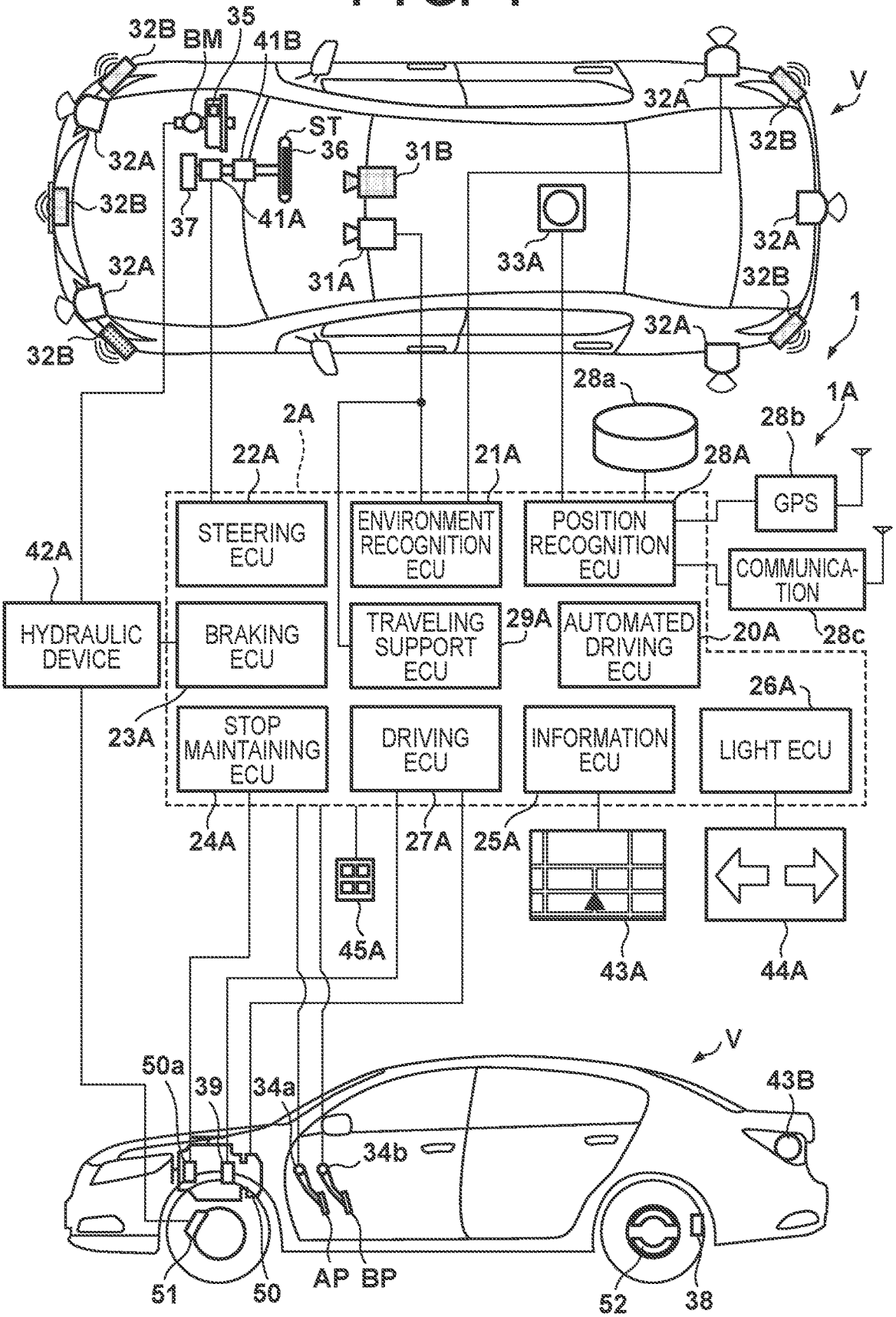
FIG. 1 is a block diagram of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

When a first travel control means instructs a second travel control means to perform alternative control, so-called self-interruption is executed so as to stop device control performed by a first travel control unit in order for device control authority to be handed over to the second travel control unit. When alternative control ends thereafter, the self-interruption that was executed needs to be cancelled. In International Publication No. 2019/116870, the first travel control unit cannot find out the execution status of the alternative control and therefore cannot determine whether or not self-interruption can be cancelled. According to the first aspect of the present invention, it is possible to make a determination to cancel self-interruption based on the execution status of alternative control.

Figure 2:
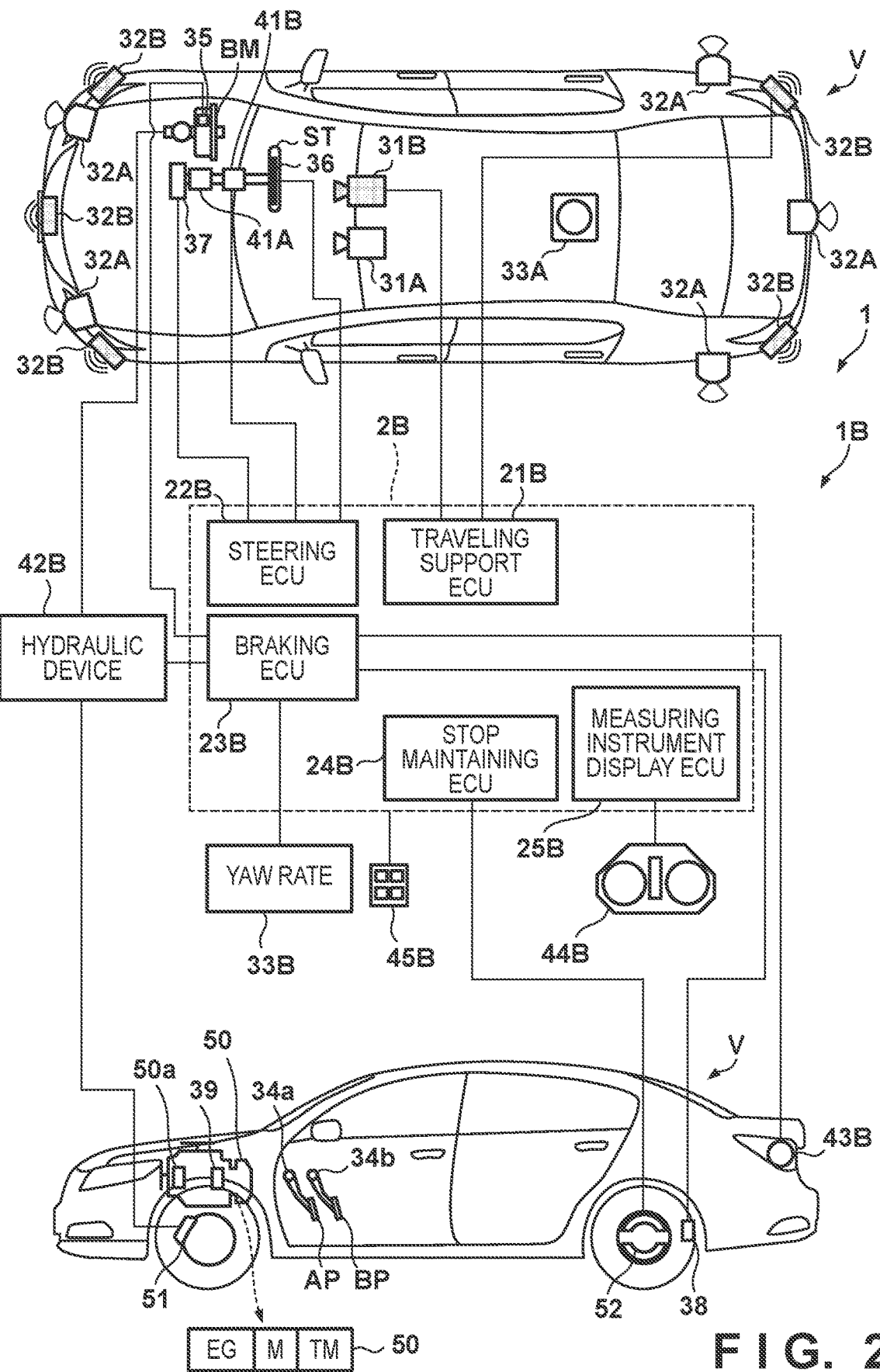
FIG. 2 is a block diagram of the vehicle control apparatus.
Figure 3:
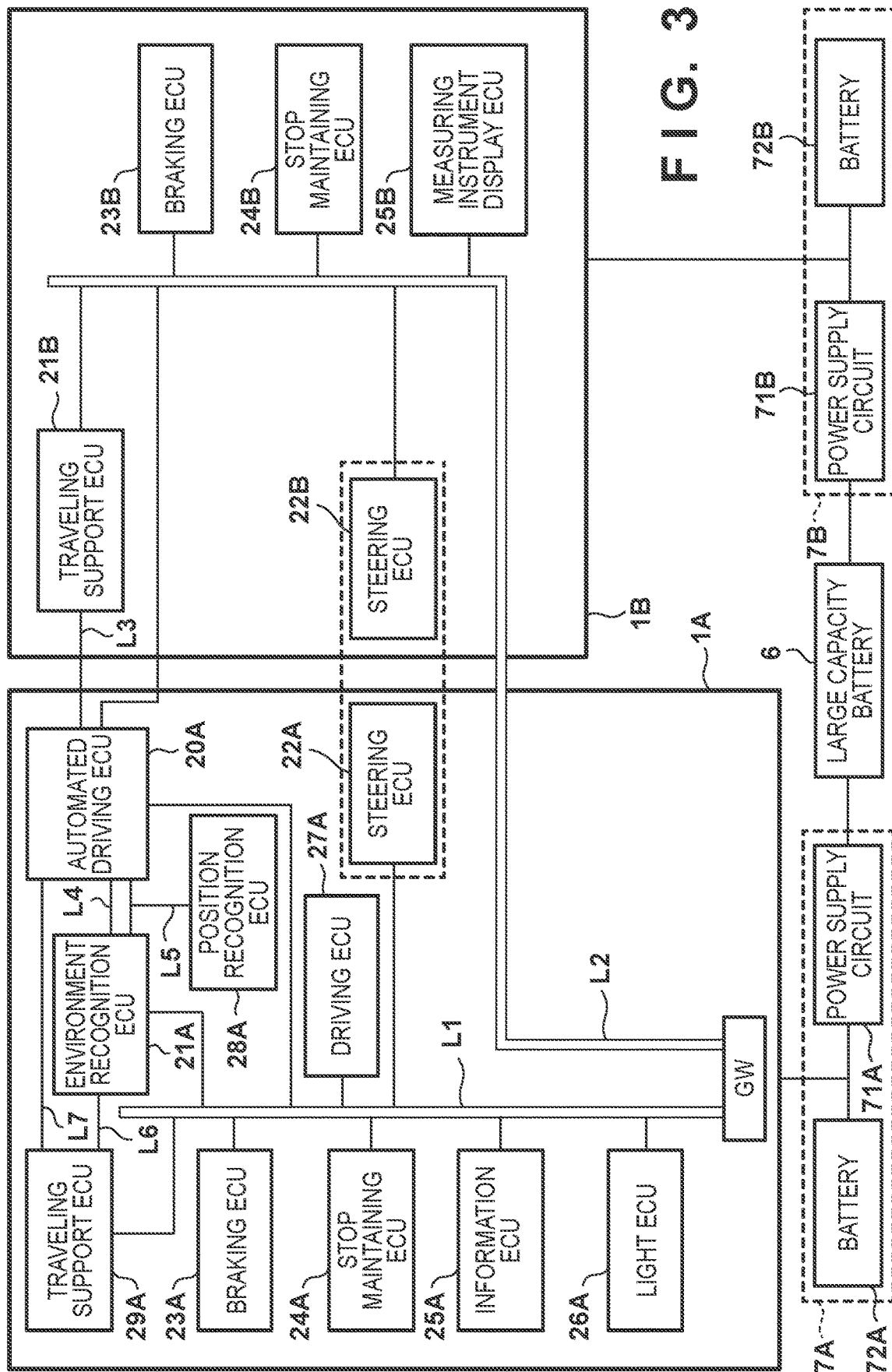
FIG. 3 is a block diagram of the vehicle control apparatus.

FIGS. 1 to 4 are block diagrams of a vehicle control apparatus 1 (control system) according to an embodiment of the present invention. The vehicle control apparatus 1 controls a vehicle V. FIGS. 1 and 2 are a plan view and a side view showing an overview of the vehicle V. As one example, the vehicle V is a sedan-type four-wheeled passenger vehicle. The vehicle control apparatus 1 includes a first control unit 1A and a second control unit 1B. FIG. 1 is a block diagram showing the configuration of the first control unit 1A, and FIG. 2 is a block diagram showing the configuration of the second control unit 1B. FIG. 3 mainly shows the configuration of a power source and communication lines between the first control unit 1A and the second control unit 1B.

The first control unit 1A and the second control unit 1B provide replication or redundancy for some of the functions realized by the vehicle V. This therefore makes it possible to improve the system reliability. The first control unit 1A performs, for example, automated driving control and normal operation control in manual driving, as well as travel support control related to danger avoidance and the like. The second control unit 1B mainly performs travel support control related to danger avoidance and the like. Travel support will sometimes be called driving support. The first control unit 1A and the second control unit 1B perform different control processing while also providing functional redundancy, thus making it possible to improve reliability while also decentralizing control processing.

The vehicle V of the present embodiment is a parallel-type hybrid vehicle, and FIG. 2 schematically illustrates the configuration of a power plant 50 that outputs drive power for rotating the driving wheels of the vehicle V. The power plant 50 includes an internal combustion engine EG, a motor M, and an automatic transmission TM. The motor M can be used not only as a drive source for accelerating the vehicle V, but also as a generator during deceleration or the like (regenerative braking).

First Control Unit 1A

The following describes the configuration of the first control unit 1A with reference to FIG. 1. The first control unit 1A includes an ECU group (control unit group) 2A. The ECU group 2A includes ECUs 20A to 29A. Each ECU includes a processor typified by a CPU, a storage device such as a semiconductor memory, an interface for interfacing with an external device, and the like. The storage device stores programs executed by the processor, data used by the processor for processing, and the like. Each ECU may include a plurality of processors, storage devices, interfaces, and the like. The number of ECUs and the functions assigned thereto can be set as desired, and can be subdivided or integrated to a greater extent than in the present embodiment. Note that the names of representative functions have been given to the ECUs 20A to 29A in FIGS. 1 and 3. For example, the ECU 20A is shown as "automated driving ECU".

The ECU 20A executes control related to automated driving as vehicle V travel control. In automated driving, at least one of driving (acceleration of the vehicle V by the power plant 50, etc.), steering, and braking of the vehicle V is automatically performed regardless of driving operations performed by the driver. In the present embodiment, driving, steering, and braking are performed automatically.

The ECU 21A is an environment recognition unit that recognizes the traveling environment of the vehicle V based on detection results from detection units 31A and 32A that detect surrounding conditions of the vehicle V. The ECU 21A generates later-described target data as surrounding environment information.

In the case of the present embodiment, the detection unit 31A is an imaging device (hereinafter, sometimes referred to as a camera 31A) that detects objects around the vehicle V by capturing images. The camera 31A is provided on a front portion of the roof of the vehicle V so as to be able to capture images of the region in front of the vehicle V. By analyzing the images captured by the camera 31A, it is possible to extract the outlines of targets and extract lane marking lines (white lines, etc.) on roads.

In the case of the present embodiment, the detection unit 32A is a LIDAR (Light Detection and Ranging, which hereinafter may be referred to as a LIDAR 32A) that detects objects around the vehicle V using light, and is configured to detect targets around the vehicle V and measure distances to targets. In the case of the present embodiment, five LIDARs 32A are provided, namely one at each corner of the front portion of the vehicle V, one at the center of the rear portion, and one on each side of the rear portion. The number of LIDARs 32A and arrangement thereof can be selected as desired.

The ECU 29A is a travel support unit that executes control related to travel support (in other words, driving support) as vehicle V travel control, based on a detection result from the detection unit 31A.

The ECU 22A is a steering control unit that controls an electric power steering device 41A. The electric power steering device 41A includes a mechanism for steering the front wheels in accordance with driving operations (steering operations) that a driver performs on a steering wheel ST. The electric power steering device 41A includes a motor that assists steering operations or generates drive power for automatically steering the front wheels, a sensor that detects the rotation speed of the motor, a torque sensor for detecting the steering torque borne by the driver, and the like.

The ECU 23A is a braking control unit that controls a hydraulic device 42A. The hydraulic device 42A realizes an ESB (Electric Servo Brake), for example. A braking operation performed on a brake pedal BP by the driver is converted into hydraulic pressure in a brake master cylinder BM and transmitted to the hydraulic device 42A. The hydraulic device 42A is an actuator capable of controlling the hydraulic pressure of hydraulic oil supplied to brake devices (for example, disc brake devices) 51 respectively provided on the four wheels based on the hydraulic pressure transmitted from the brake master cylinder BM, and the ECU 23A controls the driving of a solenoid valve or the like provided in the hydraulic device 42A. In the case of the present embodiment, the ECU 23A and the hydraulic device 42A constitute an electric servo brake, and the ECU 23A controls the distribution of braking force generated by the four brake devices 51 and braking force generated by regenerative braking of the motor M, for example.

The ECU 24A is a stop maintenance control unit that controls an electric parking lock device 50a provided in the automatic transmission TM. The electric parking lock device 50a mainly includes a mechanism for locking an internal mechanism of the automatic transmission TM when the P range (parking range) is selected. The ECU 24A can control the locking and unlocking performed by the electric parking lock device 50a.

The ECU 25A is an in-vehicle notification control unit that controls an information output device 43A that gives in-vehicle information notifications. The information output device 43A includes a display device, such as a head-up display, and an audio output device. A vibrating device may also be included. The ECU 25A causes the information output device 43A to output various types of information such as vehicle speed and outside air temperature information and route guidance information, for example.

The ECU 26A is an out-of-vehicle notification control unit that controls an information output device 44A that gives out-of-vehicle information notifications. In the case of the present embodiment, the information output device 44A is a direction indicator (hazard lamp), and the ECU 26A indicates the traveling direction of the vehicle V to the outside by controlling the blinking of the information output device 44A when serving as a direction indicator, and can increase attention to the vehicle V outside of the vehicle by controlling the blinking of the information output device 44A when serving as a hazard lamp.

The ECU 27A is a drive control unit that controls the power plant 50. In the present embodiment, one ECU 27A is assigned to the power plant 50, but one ECU may be assigned to each of the internal combustion engine EG, the motor M, and the automatic transmission TM. The ECU 27A controls the output of the internal combustion engine EG and the motor M and the gear ratio of the automatic transmission TM in according with, for example, the vehicle speed and driving operations that are performed by the driver and detected by an operation detection sensor 34a provided on an accelerator pedal AP and an operation detection sensor 34b provided on the brake pedal BP. The automatic transmission TM is provided with a rotation speed sensor 39 for detecting the rotation speed of the output shaft of the automatic transmission TM as a sensor for detecting the traveling state of the vehicle V. The vehicle speed of the vehicle V can be calculated from the detection result of the rotation speed sensor 39.

The ECU 28A is a position recognition unit that recognizes the current position and the course of the vehicle V. The ECU 28A controls a gyro sensor 33A, a GPS sensor 28b, and a communication device 28c, and performs information processing on detection results and communication results. The gyro sensor 33A detects rotational movement of the vehicle V. The course of the vehicle V can be determined based on detection results from the gyro sensor 33A, for example. The GPS sensor 28b detects the current position of the vehicle V. The communication device 28c performs wireless communication with a server that provides map information and traffic information, and acquires such information. Highly accurate map information can be stored in a database 28a, and the ECU 28A can specify the position of the vehicle V in a lane with higher accuracy based on such map information and the like.

An input device 45A is arranged in the vehicle so as to be able to be operated by the driver, and accepts instructions and information input by the driver.

Second Control Unit 1B

The following describes the configuration of the second control unit 1B with reference to FIG. 2. The second control unit 1B includes an ECU group (control unit group) 2B. The ECU group 2B includes ECUs 21B to 25B. Each ECU includes a processor typified by a CPU, a storage device such as a semiconductor memory, an interface for interfacing with an external device, and the like. The storage device stores programs executed by the processor, data used by the processor for processing, and the like. Each ECU may include a plurality of processors, storage devices, interfaces, and the like. The number of ECUs and the functions assigned thereto can be set as desired, and can be subdivided or integrated to a greater extent than in the present embodiment. Note that, similarly to the ECU group 2A, the names of representative functions have been given to the ECUs 21B to 25B in FIGS. 2 and 3.

The ECU 21B is an environment recognition unit that recognizes the traveling environment of the vehicle V based on detection results from detection units 31B and 32B that detect surrounding conditions of the vehicle V, and is also a travel support unit that executes control related to travel support (in other words, driving support) as vehicle V travel control. The ECU 21B generates later-described target data as surrounding environment information.

Note that although the ECU 21B has an environment recognition function and a travel support function in the present embodiment, an ECU may be provided for each function as with the ECU 21A and the ECU 29A of the first control unit 1A. Conversely, in the first control unit 1A, the functions of the ECU 21A and the ECU 29A may be realized by one ECU as with the ECU 21B.

In the case of the present embodiment, the detection unit 31B is an imaging device (hereinafter, sometimes referred to as a camera 31B) that detects objects around the vehicle V by capturing images. The camera 31B is provided on a front portion of the roof of the vehicle V so as to be able to capture images of the region in front of the vehicle V. By analyzing the images captured by the camera 31B, it is possible to extract the outlines of targets and extract lane marking lines (white lines, etc.) on roads. In the case of the present embodiment, the detection unit 32B is a millimeter-wave radar (hereinafter, may be referred to as a radar 32B) that detects objects around the vehicle V using radio waves, and is configured to detect targets around the vehicle V and measure distances to targets. In the case of the present embodiment, five radars 32B are provided, namely one at the center of the front portion of the vehicle V, one at each corner of the front portion, and one at each corner of the rear portion. The number of radars 32B and arrangement thereof can be selected as desired.

The ECU 22B is a steering control unit that controls an electric power steering device 41B. The electric power steering device 41B includes a mechanism for steering the front wheels in accordance with driving operations (steering operations) that a driver performs on a steering wheel ST. The electric power steering device 41B includes a motor that assists steering operations or generates drive power for automatically steering the front wheels, a sensor that detects the rotation speed of the motor, a torque sensor for detecting the steering torque borne by the driver, and the like. Also, a steering angle sensor 37 is electrically connected to the ECU 22B via a later-described communication line L2, and the electric power steering device 41B can be controlled based on detection results from the steering angle sensor 37. The ECU 22B can acquire a detection result from a sensor 36 that detects whether or not the driver is gripping the steering wheel ST, and can monitor the gripping stale of the driver.

The ECU 23B is a braking control unit that controls a hydraulic device 42B. The hydraulic device 42B realizes VSA (Vehicle Stability Assistance), for example. A braking operation performed on the brake pedal BP by the driver is converted into hydraulic pressure in the brake master cylinder BM and transmitted to the hydraulic device 42B. The hydraulic device 42B is an actuator capable of controlling the hydraulic pressure of hydraulic oil supplied to the brake devices 51 based on the hydraulic pressure transmitted from the brake master cylinder BM, and the ECU 23B controls the driving of a solenoid valve or the like provided in the hydraulic device 42B.

In the case of the present embodiment, wheel speed sensors 38 provided for each of the four wheels, a yaw rate sensor 33B, and a pressure sensor 35 for detecting the pressure in the brake master cylinder BM are electrically connected to the ECU 23B and the hydraulic device 42B, and an ABS function, traction control and a vehicle V attitude control function are realized based on detection results from these sensors. For example, the ECU 23B adjusts the braking force of the wheels based on detection results from the wheel speed sensors 38 provided for the four wheels so as to suppress sliding of the wheels. Also, the braking force of the wheels is adjusted based on the rotational angular velocity of the vehicle V around the vertical axis detected by the yaw rate sensor 33B to suppress a sudden change in the attitude of the vehicle V.

The ECU 23B also functions as an out-of-vehicle notification control unit that controls an information output device 43B that gives out-of-vehicle information notifications. In the case of the present embodiment, the information output device 43B is a brake lamp, and the ECU 23B can turn on the brake lamp during braking or the like. This therefore makes it possible to increase the attention of a following vehicle with respect to the vehicle V.

The ECU 24B is a stop maintenance control unit that controls an electric parking brake device (e.g., a drum brake) 52 provided on a rear wheel. The electric parking brake device 52 includes a mechanism for locking the rear wheel. The ECU 24B can control the locking and unlocking of the rear wheel by the electric parking brake device 52.

The ECU 25B is an in-vehicle notification control unit that controls an information output device 44B that gives in-vehicle information notifications. In the case of the present embodiment, the information output device 44B includes a display device arranged in an instrument panel. The ECU 25B can cause the information output device 44B to output various types of information such as vehicle speed and fuel consumption.

An input device 45B is arranged in the vehicle so as to be able to be operated by the driver, and accepts instructions and information input by the driver.

Communication Lines

The following describes an example of communication lines of the vehicle control apparatus 1 for enabling communication between the ECUs, with reference to FIG. 3. The vehicle control apparatus 1 includes wired communication lines L1 to L7. The ECUs 20A to 27A and 29A of the first control unit 1A are connected to the communication line L1. Note that the ECU 28A may also be connected to the communication line L1.

The ECUs 21B to 25B of the second control unit 1B are connected to the communication line L2. The ECU 20A of the first control unit 1A is also connected to the communication line L2. The communication line L3 connects the ECU 20A and the ECU 21B, and the communication line L4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be the same or different, and may be set differently according to communication environment conditions such as the communication speed, the communication data amount, and durability. For example, in view of communication speed, the communication lines L3 and L4 may be Ethernet (registered trademark) lines. The communication lines L1, L2, and L5 to L7 may be CAN lines, for example.

The first control unit 1A includes a gateway GW. The gateway GW relays communication performed on the communication line L1 and the communication line L2. For this reason, the ECU 21B can output control commands to the ECU 27A via the communication line L2, the gateway GW, and the communication line L1, for example.

Power Source

The following describes a power source of the vehicle control apparatus 1 with reference to FIG. 3. The vehicle control apparatus 1 includes a large capacity battery 6, a power source 7A, and a power source 7B. The large capacity battery 6 is a battery for driving the motor M, and is also a battery that is charged by the motor M.

The power source 7A is a power source that supplies power to the first control unit 1A, and includes a power source circuit 71A and a battery 72A. The power source circuit 71A is a circuit that supplies power from the large capacity battery 6 to the first control unit 1A, and, steps down the output voltage (for example, 190 V) of the large capacity battery 6 to a reference voltage (for example, 12 V). The battery 72A is a 12V lead battery, for example. By providing the battery 72A, it is possible to supply power to the first control unit 1A even if the supply of power from the large capacity battery 6 or the power source circuit 71A is cut off or reduced.

The power source 7B is a power source that supplies power to the second control unit 1B, and includes a power source circuit 71B and a battery 72B. The power source circuit 71B is similar to the power source circuit 71A, and is a circuit that supplies power from the large capacity battery 6 to the second control unit 1B. The battery 72B is similar to the battery 72A, and is a 12V lead battery, for example. By providing the battery 72B, it is possible to supply power to the second control unit 1B even if the supply of power from the large capacity battery 6 or the power source circuit 71B is cut off or reduced.

Overall Configuration

Figure 4:
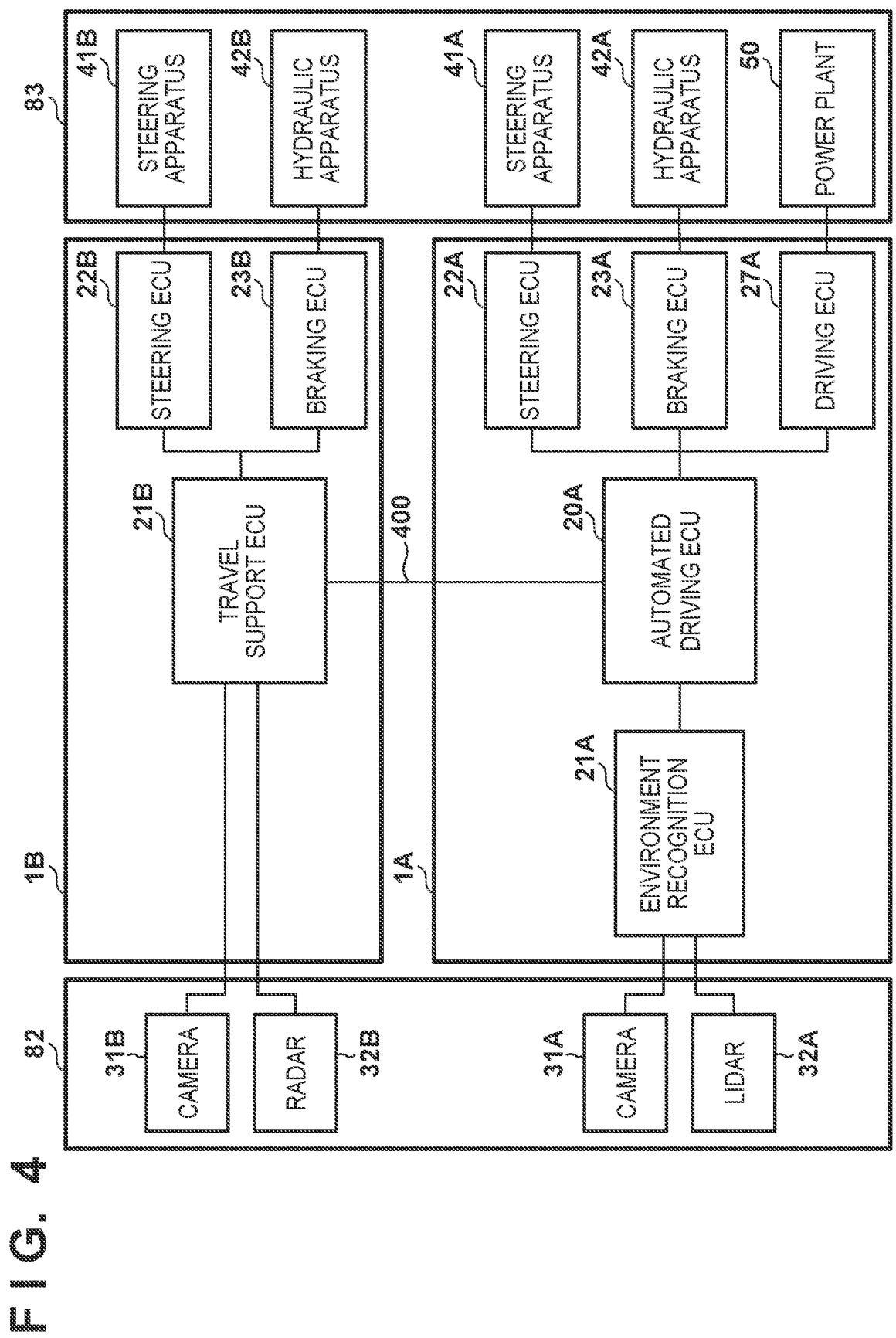
FIG. 4 is a block diagram of the vehicle control apparatus.

The following describes the overall configuration of the vehicle V from another viewpoint, with reference to FIG. 4. The vehicle V includes the first control unit 1A, the second control unit 1B, an outside world recognition device group 82, and an actuator group 83. In FIG. 4, the ECU 20A, the ECU 21A, the ECU 22A, the ECU 23A, and the ECU 27A are illustrated as examples of ECUs included in the first control unit 1A, and the ECU 21B, the ECU 22B, and the ECU 23B are illustrated as examples of ECUs included in the second control unit 1B.

The outside world recognition device group 82 is a set of outside world recognition devices (sensors) installed on the vehicle V, and is a group of devices that are to be subjected to vehicle V travel control. The outside world recognition device group 82 includes, for example, the camera 31A, the camera 31B, the LIDAR 32A, and the radar 32B that were described above. In the case of the present embodiment, the camera 31A and the LIDAR 32A are connected to the ECU 21A of the first control unit 1A and operate according to instructions from the ECU 21A (i.e., are controlled by the first control unit 1A). The ECU 21A acquires outside world information obtained by the camera 31A and the LIDAR 32A, and supplies the outside world information to the ECU 20A of the first control unit 1A. Also, the camera 31B and the radar 32B are connected to the ECU 21B of the second control unit 1B and operate according to instructions from the ECU 21B (i.e., are controlled by the second control unit 1B). The ECU 21B acquires outside world information obtained by the camera 31B and the radar 32B, and supplies the outside world information to the ECU 20A of the first control unit 1A. Accordingly, the first control unit 1A (ECU 20A) can execute automated driving control with use of the outside world information obtained from the camera 31A, the camera 31B, the LIDAR 32A, and the radar 32B.

The actuator group 83 is a set of actuators installed in the vehicle V, and is a group of devices that are to be subjected to vehicle V travel control. The actuator group 83 includes, for example, the electric power steering device 41A, the electric power steering device 41B, the hydraulic device 42A, the hydraulic device 42B, and the power plant 50 that were described above. The electric power steering device 41A and the electric power steering device 41B are steering actuators for steering the vehicle V. The hydraulic device 42A and the hydraulic device 42B are braking actuators for braking the vehicle V. Further, the power plant 50 is a drive actuator for driving the vehicle V.

In the case of the present embodiment, the electric power steering device 41A, the hydraulic device 42A, and the power plant 50 are connected to the ECU 20A via the ECU 22A, the ECU 23A, and the ECU 27A, respectively, and operate according to instructions from the ECU 20A (i.e., are controlled by the first control unit 1A). Also, the electric power steering device 41B and the hydraulic device 42B are connected to the ECU 21B via the ECU 22B and the ECU 23B, respectively, and operate according to instructions from the ECU 21B (i.e., are controlled by the second control unit 1B).

The first control unit 1A (ECU 20A) communicates with a portion of the outside world recognition device group 82 (the camera 31A and the LIDAR 32A) via one communication path, and communicates with a portion of the actuator group 83 (the electric power steering device 41A, the hydraulic device 42A, and the power plant 50) via another communication path. Also, the second control unit 1B (ECU 21B) communicates with a portion of the outside world recognition device group 82 (the camera 31B and the radar 32B) via one communication path, and communicates with a portion of the actuator group 83 (the electric power steering device 41B and the hydraulic device 42B) via another communication path. The communication path connected to the ECU 20A and the communication path connected to the ECU 21B may be different from each other. These communication paths may be, for example, CAN (Controller Area Network) paths or Ethernet (registered trademark) paths. Also, the ECU 20A and the ECU 21B are connected to each other via a communication path. This communication path may be, for example, a CAN (Controller Area Network) path or an Ethernet (registered trademark) path. Moreover, they may be connected via both a CAN path and an Ethernet (registered trademark) path.

The first control unit 1A (ECU 20A) is constituted by a processor such as a CPU and a memory such as RAM, and is configured to be capable of executing vehicle V travel control (e.g., automated driving control). For example, as the outside world information obtained by the outside world recognition device group 82, the ECU 20A acquires outside world information obtained by the camera 31A and the LIDAR 32A via the ECU 21A, and obtains outside world information obtained by the camera 31B and the radar 32B via the ECU 21B. Then, the ECU 20A generates a route and a speed that the vehicle V is to realize during automated driving based on the acquired outside world information, and determines target control amounts (driving amounts, braking amounts, and steering amounts) for the vehicle V to realize the route and speed. The ECU 20A can control the traveling of the vehicle V (e.g., automated driving) by generating operation amounts (command values (signal values) such as voltages or currents) for actuators based on the determined target control amounts for the vehicle V, and controlling the actuator group 83 (the electric power steering device 41A, the hydraulic device 42A, and the power plant 50) using the operation amounts.

Here, the ECU 20A can also operate as a detection unit that detects a deterioration in the travel control functionality of the vehicle V performed by the first control unit 1A. For example, the ECU 20A can detect a deterioration in the travel control functionality by monitoring the communication status of the communication path to the outside world recognition device group 82 and the communication status of the communication path to the actuator group 83, and detecting a deterioration in the communication functionality with the outside world recognition device group 82 and the actuator group 83 based on the communication statuses. Examples of a deterioration in communication functionality include a disconnection of communication and a decrease in communication speed. Also, the ECU 20A may detect a deterioration in travel control functionality by detecting a deterioration in the outside world detection performance of the outside world recognition device group 82 and a deterioration in the drive performance of the actuator group 83. Further, if the ECU 20A is configured to diagnose its own processing performance (e.g., processing speed), the ECU 20A may detect a deterioration in travel control functionality based on the diagnosis result. Note that although the ECU 20A operates as a detection unit for detecting a deterioration in its own travel functionality in the present embodiment, the present invention is not limited to this, and the detection unit may be provided separately from the ECU 20A, or the second control unit 1B (e.g., the ECU 21B) may operate as the detection unit.

The second control unit 1B (ECU 21B) is constituted by a processor such as a CPU and a memory such as RAM, and is configured to be capable of executing vehicle V travel control. Similarly to the ECU 20A of the first control unit 1A, the ECU 21B can determine target control amounts (a braking amount and a steering amount) for the vehicle V, generate operation amounts for the actuators based on the determined target control amounts, and control the actuator group 83 (the electric power steering device 41B and the hydraulic device 42B) using the operation amounts. In the normal state where a deterioration in travel control functionality has not been detected by the ECU 20A, the ECU 21B acquires outside world information obtained by the camera 31B and the radar 32B and supplies the outside world information to the ECU 20A, but if a deterioration in travel control functionality has been detected by the ECU 20A, the ECU 21B performs vehicle V travel control instead of the ECU 20A (i.e., performs alternative control). Alternative control includes, for example, degeneration control for executing function restriction to lower the control level according to the control level of vehicle V automated driving.

As described above, in the vehicle control apparatus 1 of the present embodiment, if a deterioration in travel control functionality is detected in the first control unit 1A while performing automated driving control, vehicle V travel control (alternative control) is performed by the second control unit 1B instead of the first control unit 1A. By providing a redundant configuration in which a plurality of control units are provided in this way, the reliability of automated driving control of the vehicle can be improved.

The following describes an example in which alternative control is performed based on a configuration in which the first control unit 1A controls the first actuator group and a first sensor group, and the second control unit 1B controls the second actuator group and a second sensor group. The first actuator group and the second actuator group are defined as being used with the same control items in vehicle V travel control. For example, when controlling the braking of the vehicle V as a control item, the first actuator group and the second actuator group respectively correspond to the hydraulic device 42A and the hydraulic device 42B. Also, when controlling the steering of the vehicle V as a control item, the first actuator group and the second actuator group respectively correspond to the electric power steering device 41A and the electric power steering device 41B. Hereinafter, the first actuator group and the second actuator group will be described, but this similarly applies to the first sensor group and the second sensor group.

For example, if a malfunction or the like occurs in any of the actuators in the first actuator group, the first control unit 1A hands over control authority of the actuator to the second control unit 1B and instructs the second control unit 1B to perform alternative control in order for alternative control to start. Then, the first control unit 1A stops not only controlling the actuator in which the malfunction or the like occurred, but also stops controlling the actuators other than the actuator in which the malfunction or the like occurred. In the present embodiment, such control interruption is referred to as "self-interruption". Then, the first control unit 1A passes, to the second control unit 1B, information regarding the first actuator group that includes the actuator in which the malfunction or the like occurred. The second control unit 1B controls the second actuator group based on the received information regarding the first actuator group. Here, the alternative control is, for example, road shoulder evacuation of the vehicle V.

When alternative control ends, it is necessary to cancel the self-interruption performed by the first control unit 1A in order to return the control authority of the actuator to the first control unit 1A. In view of this, in the present embodiment, the execution status of alternative control in the second control unit 1B is transmitted to the first control unit 1A via a communication path 400 between the second control unit 1B and the first control unit 1A. According to this configuration, the first control unit 1A can monitor the execution status of alternative control in the second control unit 1B, and can cancel the self-interruption at an appropriate timing when alternative control ends.

Figure 5:
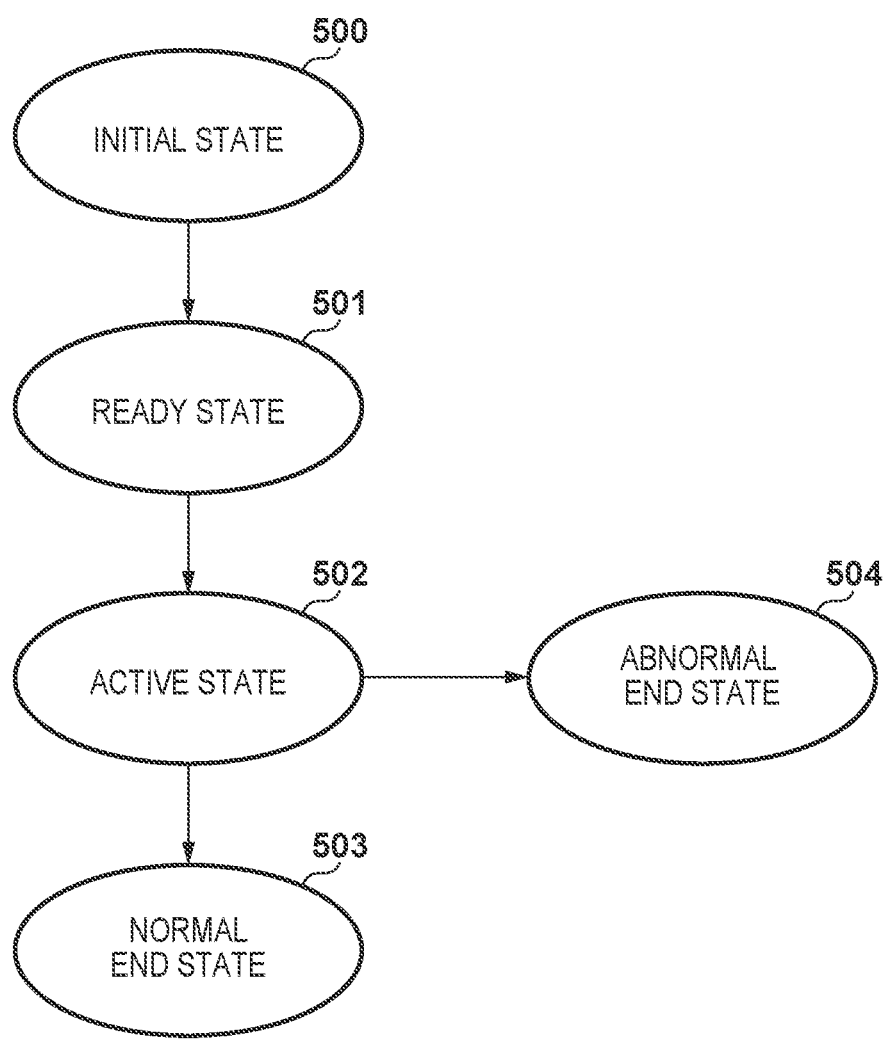
FIG. 5 is a diagram for describing transitions between execution states of alternative control.

FIG. 5 is a diagram for describing transitions between execution states of alternative control in the vehicle V. States 500 to 504 in FIG. 5 show state transitions of the second control unit 1B when executing alternative control. An initial state 500 is the state of the second control unit 1B when the ignition of the vehicle V is turned on. Then, the second control unit 1B performs self-diagnosis processing after the ignition is turned on, and if it is determined that automated driving control can be performed, the initial state 500 changes to a ready state 501.

If a malfunction occurs in an actuator during automated driving control for example, the second control unit 1B is instructed by the first control unit 1A to perform alternative control as described above, and the ready state 501 changes to an active state 502. Specifically, in the present embodiment, the active state 502 refers a state in which alternative control is being executed. Also, when there is a change to the active state 502, the above-described self-interruption is performed in the first control unit 1A. If alternative control ends normally in the second control unit 1B, the active state 502 changes to a normal end state 503. The first control unit 1A recognizes that alternative control has ended and cancels the self-interruption. On the other hand, if alternative control ends abnormally, the active state 502 changes to an abnormal end state 504. The first control unit 1A recognizes that alternative control has ended and cancels the self-interruption.

The execution states of alternative control are not limited to those shown in FIG. 5, and other states may exist. For example, when alternative control is instructed by the first control unit 1A, if a sensor or an actuator on the second control unit 1B side is not operating due to environmental factors or the like, there may be a prohibited state indicating that alternative control cannot be performed. There may also be a state indicating a special factor, such as a communication malfunction caused by a communication path failure or the like. In any case, in the present embodiment, states change in the order of first the initial state 500, then the ready state 501, then the active state 502, and then the normal end state 503, or in the order of first the initial state 500, then the ready state 501, then the active state 502, and then the abnormal end state 504.

The communication path 400 for indicating the execution state of alternative control in the second control unit 1B is redundantly provided between the first control unit 1A and the second control unit 1B. For example, in the present embodiment, the communication path 400 for indicating the execution state of alternative control is redundantly provided by using two types of communication media.

FIG. 6 is a diagram showing blocks that are related to operations in the present embodiment in the internal configuration of the first control unit 1A. As shown in FIG. 6, the first control unit 1A includes a state determination unit 601, a cancellation permission determination unit 602, and an EDR (Event Data Recorder) data generation unit 603. These blocks are configured as, for example, a computer system that includes a processor and a memory. Also, the blocks may be configured as a plurality of chips, or a plurality of blocks may be configured in a single chip. Communication paths 400a and 400b in FIG. 6 correspond to the communication path 400 in FIG. 4. The communication paths 400a and 400b are not necessarily the same type of communication medium. For example, different types of communication media such as CAN and Ethernet may be used. In the present embodiment, the communication medium of the communication path 400a is a CAN path, and the communication medium of the communication path 400b is an Ethernet path.

First state information received on the communication path 400a and second state information received on the communication path 400b are input to the state determination unit 601 and the cancellation permission determination unit 602 via a communication interface (I/F) 607. The state determination unit 601 determines whether or not alternative control is being executed in the second control unit 1B based on the first state information and the second state information. For example, if either state information indicates the active state 502, the fact that the current state is the active state 502 is output as a state determination signal 604. The state determination signal 604 is output externally or internally in the first control unit 1A, or both, and is also output to the EDR data generation unit 603 that is described later.

The second control unit 1B transmits the state information shown in FIG. 5 to the first control unit 1A via the communication paths 400a and 400b as required. At this time, the same state information is transmitted over the communication paths 400a and 400b. For example, if the state of the second control unit 1B changes in the order of first the initial state 500, then the ready state 501, then the active state 502, and then the normal end state 503, the state information changes in the above order on the communication paths 400a and 400b. However, in general, CAN has a faster communication speed than Ethernet, and therefore even if the transmission timing on the second control unit 1B side is the same fir each of the communication paths 400a and 400b, on the first control unit 1A side, the changes in state information occur slightly earlier on the communication path 400a. For example, at the timing when the first control unit 1A receives the normal end state 503 as the state information on the communication path 400a, the state information received on the communication path 400b may still be the active state 502.

When the first control unit 1A receives the normal end state 503 or the abnormal end state 504 from the second control unit 1B, the first control unit 1A cancels self-interruption. However, if the first state information received on the communication path 400a is the normal end state 503 and the second state information received on the communication path 400b is the active state 502, it is unclear whether or not self-interruption may be cancelled. In view of this, in the present embodiment, in the case where the first state information received on the communication path 400a and the second state information received on the communication path 400b are different, whether or not the first control unit 1A is permitted to cancel self-interruption is set in advance. The following are examples of such cases.

(1) If both the first state information and the second state information indicate the initial state 500 . . . permit cancellation of self-interruption.

(2) If both the first state information and the second state information indicate the ready state 501 . . . permit cancellation of self-interruption.

(3) If both the first state information and the second state information indicate the active state 502 . . . do not permit cancellation of self-interruption.

(4) If both the first state information and the second state information indicate the normal end state 503 . . . permit cancellation of self-interruption.

(5) If both the first state information and the second state information indicate the abnormal end state 504 . . . permit cancellation of self-interruption.

(6) If the first state information indicates the ready state 501 and the second state information indicates the initial state 500, permit cancellation of self-interruption.

(7) If the first state information indicates the active state 502 and the second state information indicates the initial state 500, do not permit cancellation of self-interruption.

(8) If the first state information indicates the active state 502 and the second state information indicates the ready state 501, do not permit cancellation of self-interruption.

(9) If the first state information indicates the normal end state 503 and the second state information indicates the initial state 500, permit cancellation of self-interruption.

(10) If the first state information indicates the normal end state 503 and the second state information indicates the ready state 501, permit cancellation of self-interruption.

(11) If the first state information indicates the normal end state 503 and the second state information indicates the active state 502, permit cancellation of self-interruption.

(12) If the first state information indicates the abnormal end state 504 and the second state information indicates the initial state 500, permit cancellation of self-interruption.

(13) If the first state information indicates the abnormal end state 504 and the second state information indicates the ready state 501, permit cancellation of self-interruption.

(14) if the first state information indicates the abnormal end state 504 and the second state information indicates the active state 502, permit cancellation of self-interruption.

The above sections (1) to (5) show cases where there is no deviation in the changes of the state information between the first state information and the second state information. The above sections (6) to (14) show cases where the change in the first state information is earlier than the change in the second state information. As shown above, if status information received on the communication path 400a indicates an "end", it is determined that alternative control has substantially ended but the transmission of the status information on the communication path 400b is delayed, and the cancellation of self-interruption in the first control unit 1A is permitted.

Upon receiving the first state information and the second state information, the cancellation permission determination unit 602 outputs a cancellation permission determination signal 605 indicating whether or not cancellation is permitted, based on the above-described determination criteria. Note that the determination criteria described above may be stored in the cancellation permission determination unit 602 in a table format, for example. The cancellation permission determination signal 605 is output externally or internally in the first control unit 1A, or both, and is also output to the EDR data generation unit 603. The EDR data generation unit 603 is a block that generates data to be stored in an event data recorder (EDR: Event Data Recorder) configured outside the first control unit 1A. The data stored in the EDR is data related to automated driving control and alternative control, and is alternative control time start/end information, for example. The operation of the EDR data generation unit 603 will be described later. Note that at least any one of the blocks shown in FIG. 6 may be configured in the automated driving ECU 20A shown in FIG. 4.

The state determination unit 601 and the cancellation permission determination unit 602 make the determination of whether the current state is the active state is 502 and make the determination of whether to permit the cancellation of self-interruption based on the first state information and the second state information. When the first control unit 1A instructs the second control unit 1B to execute alternative control, the first state information and the second state information change from the ready state 501 to the active state 502, but in reality, the change does not occur immediately, but rather occurs after a predetermined time has elapsed. Here, the predetermined time includes the time required for the alternative control execution instruction to be transmitted to the second control unit 1B, the time until alternative control is started in the second control unit 1B, and the time required for state information indicating the active state 502 to be transmitted from the second control unit 1B on the communication path 400a and 400b.

Accordingly, if the state determination unit 601 and the cancellation permission determination unit 602 make the above-described determinations based on the first state information and the second state information immediately after the execution of alternative control is instructed, the determinations will be made based on the ready state 501 when it is originally intended to be made based on the active state 502.

Figure 7A:
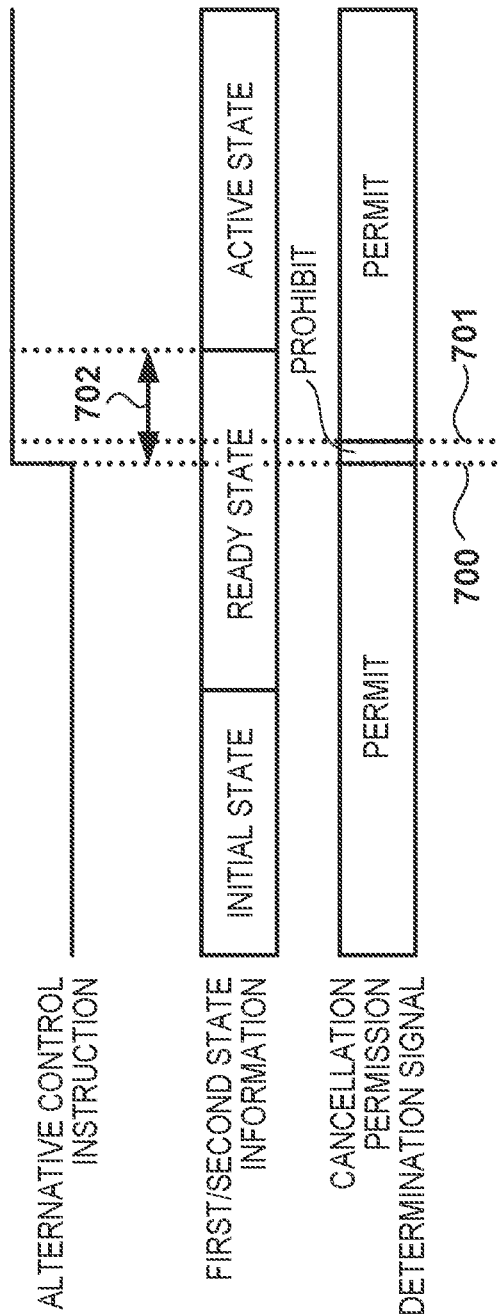

FIG. 7A is a diagram for describing a case where the determinations are made immediately after the execution of alternative control is instructed by the first control unit 1A.

A timing 700 in FIG. 7A indicates the timing at which the execution of alternative control is instructed. Also, a timing 701 indicates the timing at which the state determination unit 601 and the cancellation permission determination unit 602 make the respective determinations.

As shown in FIG. 7A, when the execution of alternative control is instructed at the timing 700, in the first control unit 1A, self-interruption is started at the timing 700, and the cancellation of the self-interruption is prohibited. However, a predetermined time 702 needs to elapse before the first/second state information changes from the ready state 501 to the active state 502, and therefore the ready state 501 remains the current state during that time. Accordingly, if the state determination unit 601 makes the determination at the timing 701 immediately after the execution of alternative control is instructed, the current state is erroneously determined to be the ready state 501 when it is originally to be determined to be the active state 502. Also, if the cancellation permission determination unit 602 makes the determination at the timing 701 immediately after the execution of alternative control is instructed, the cancellation of self-interruption is erroneously determined to be permitted when it is originally to be determined to be prohibited. As a result, when the first/second state information indicates the active state 502 after the elapse of the predetermined time 702, self-interruption is cancelled.

Figure 7B:
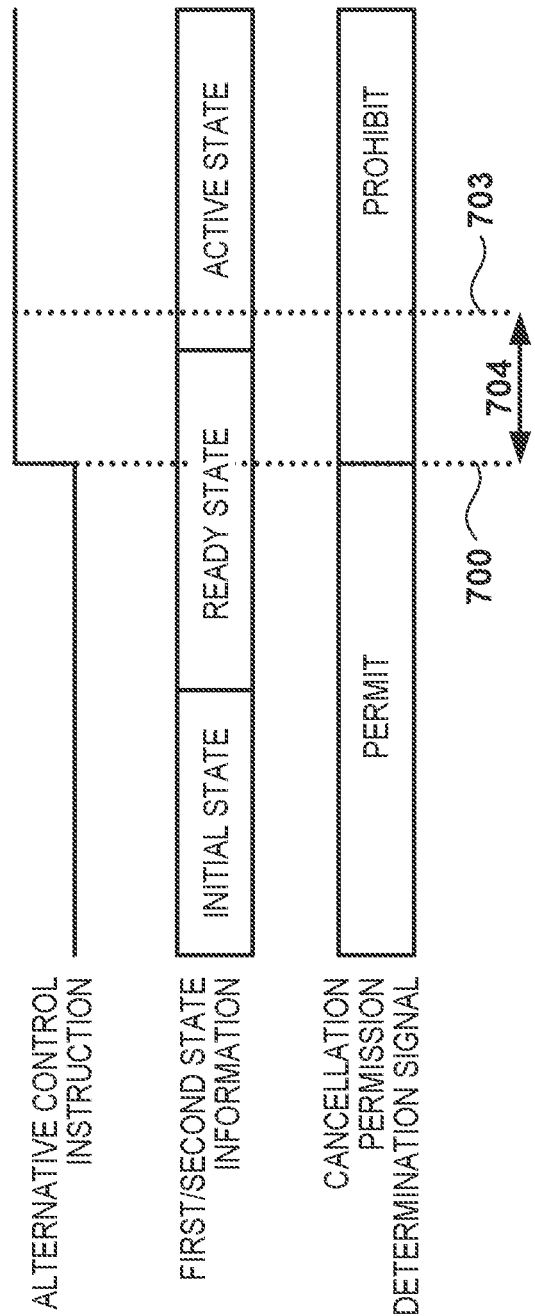

In view of this, in the present embodiment, as shown in FIG. 7B, after the execution of alternative control has been instructed and self-interruption has been performed, restriction is performed such that the state determination unit 601 and the cancellation permission determination unit 602 do not make the determinations for a predetermined time 704. It is sufficient that the predetermined time 704 is the same as or longer than the predetermined time 702 in FIG. 7A. In other words, at a timing 703 after the elapse of the predetermined time 704, the state determination unit 601 and the cancellation permission determination unit 602 makes the determinations. According to this configuration, the state determination unit 601 makes the determination after the first/second state information has changed from the ready state 501 to the active state 502, thus making it possible to correctly determine that the current state is the active state 502. Also, the cancellation permission determination unit 602 makes the determination after the first/second state information has changed from the ready state 501 to the active state 502, thus making it possible to prevent the case where the cancellation of self-interruption is permitted even though the current state is the active state 502.

FIG. 8 is a flowchart showing cancellation permission determination processing performed by the cancellation permission determination unit 602. The processing in FIG. 8 is realized by a processor in the first control unit 1A reading out and executing a program stored in a memory such as a ROM, for example.

In step S101, the cancellation permission determination unit 602 detects that an alternative control execution instruction was output from the first control unit 1A to the second control unit 1B. For example, the communication I/F 607 may monitor the information on the communication paths 400a and 400b, and the cancellation permission determination unit 602 may detect that the alternative control execution instruction was output based on the monitoring result.

In step S102, the cancellation permission determination unit 602 makes a determination regarding the elapse of a predetermined time. For example, the cancellation permission determination unit 602 may be configured to include a timer function and determine the passage of the predetermined time. The predetermined time here is the predetermined time 704 in FIG. 7B. After the elapse of the predetermined time, processing proceeds from step S102 to step S103.

In step S103, the cancellation permission determination unit 602 acquires the first state information received on the communication path 400a, and in step S104, acquires the second state information received on the communication path 400b.

In step S105, the cancellation permission determination unit 602 determines whether or not to permit the cancellation of self-interruption based on the first state information acquired in step S103 and the second state information acquired in step S104. As described above, this determination is made in accordance with a determination criteria table that is stored internally, for example. If it was determined in step S105 that the cancellation of self-interruption is permitted, processing proceeds to step S106, and the cancellation permission determination unit 602 outputs the cancellation permission determination signal 605 in which the content "cancellation permitted" is set. If it was determined in step S105 that the cancellation of self-interruption is not permitted, processing proceeds to step S107, and the cancellation permission determination unit 602 outputs the cancellation permission determination signal 605 in which the content "cancellation prohibited" is set. After steps S106 and S107, the processing in FIG. 8 ends.

According to the above processing, the cancellation permission determination unit 602 makes the determination after the first/second state information has changed from the ready state 501 to the active state 502, thus making it possible to prevent the cancellation of self-interruption from being permitted even though the current state is the active state 502.

FIG. 9 is a flowchart showing state determination processing performed in the state determination unit 601. The processing in FIG. 9 is realized by a processor in the first control unit 1A reading out and executing a program stored in a memory such as a ROM, for example.

In step S201, the state determination unit 601 detects that an alternative control execution instruction was output from the first control unit 1A to the second control unit 1B. For example, the communication I/F 607 may monitor the information on the communication paths 400a and 400b, and the state determination unit 601 may detect that the alternative control execution instruction was output based on the monitoring result.

In step S202, the state determination unit 601 makes a determination regarding the elapse of a predetermined time. For example, the state determination unit 601 may be configured to include a timer function and determine the passage of the predetermined time. The predetermined time here is the predetermined time 704 in FIG. 7B. After the elapse of the predetermined time, processing proceeds from step S202 to step S203.

In step S203, the state determination unit 601 acquires the first state information received on the communication path 400a, and in step S204, acquires the second state information received on the communication path 400b.

In step S205, the state determination unit 601 determines whether the current state is the active state is 502 based on the first state information acquired in step S203 and the second state information acquired in step S204. For example, the state determination unit 601 may determine that the current state is the active state 502 if either the first state information or the second state information indicates the active state 502. If it was determined in step S205 that the current state is the active state 502, processing proceeds to step S206, and the state determination unit 601 outputs a state determination signal 604 in which the content "active state" is set. However, if it was determined in step S205 that the current state is not the active state 502, processing proceeds to step S207, and the state determination unit 601 outputs the state determination signal 604 in which the content "not active state" is set. After steps S206 and S207, the processing in FIG. 9 ends.

According to the above processing, the state determination unit 601 makes the determination after the first/second state information has changed from the ready state 501 to the active state 502, thus making it possible to correctly determine that the current state is the active state 502.

Next, the operation of the EDR data generation unit 603 will be described. The EDR data generation unit 603 is a block that generates data indicating event information for storage in an EDR (not shown) configured outside the first control unit 1A. Here, the data to be stored in the EDR is information indicating whether or not alternative control is being executed.

The information that indicates whether or not alternative control is being executed and that is to be stored in the EDR is originally determined based on the first state information and the second state information. However, as described above, the first state information and the second state information have a deviation in the transition of state information between them. In view of this, in the present embodiment, the information that indicates whether or not alternative control is being executed and that is to be stored in the EDR is determined based on the state determination signal 604 and the cancellation permission determination signal 605.

FIG. 10 is a diagram showing the state determination signal 604 and the cancellation permission determination signal 605 when there is a change from the active state 502 to the normal end state 503. In the present embodiment, if the condition that the state determination signal 604 indicates the active state 502 and the cancellation permission determination signal 605 indicates "cancellation prohibited" is satisfied, the EDR data generation unit 603 generates, as EDR data 606, information indicating that alternative control is being executed, and outputs the generated information to the EDR. On the other hand, if the above condition is not satisfied, the EDR data generation unit 603 generates information indicating that alternative control is not being executed as the EDR data 606, and outputs the generated information to the EDR. Specifically, as shown in FIG. 10, before a timing 1001, the EDR data 606 indicating "alternative control execution period" is output to the EDR, and after a timing 1001, the EDR data 606 indicating "not alternative control execution period" is output to the EDR.

Figure 11:
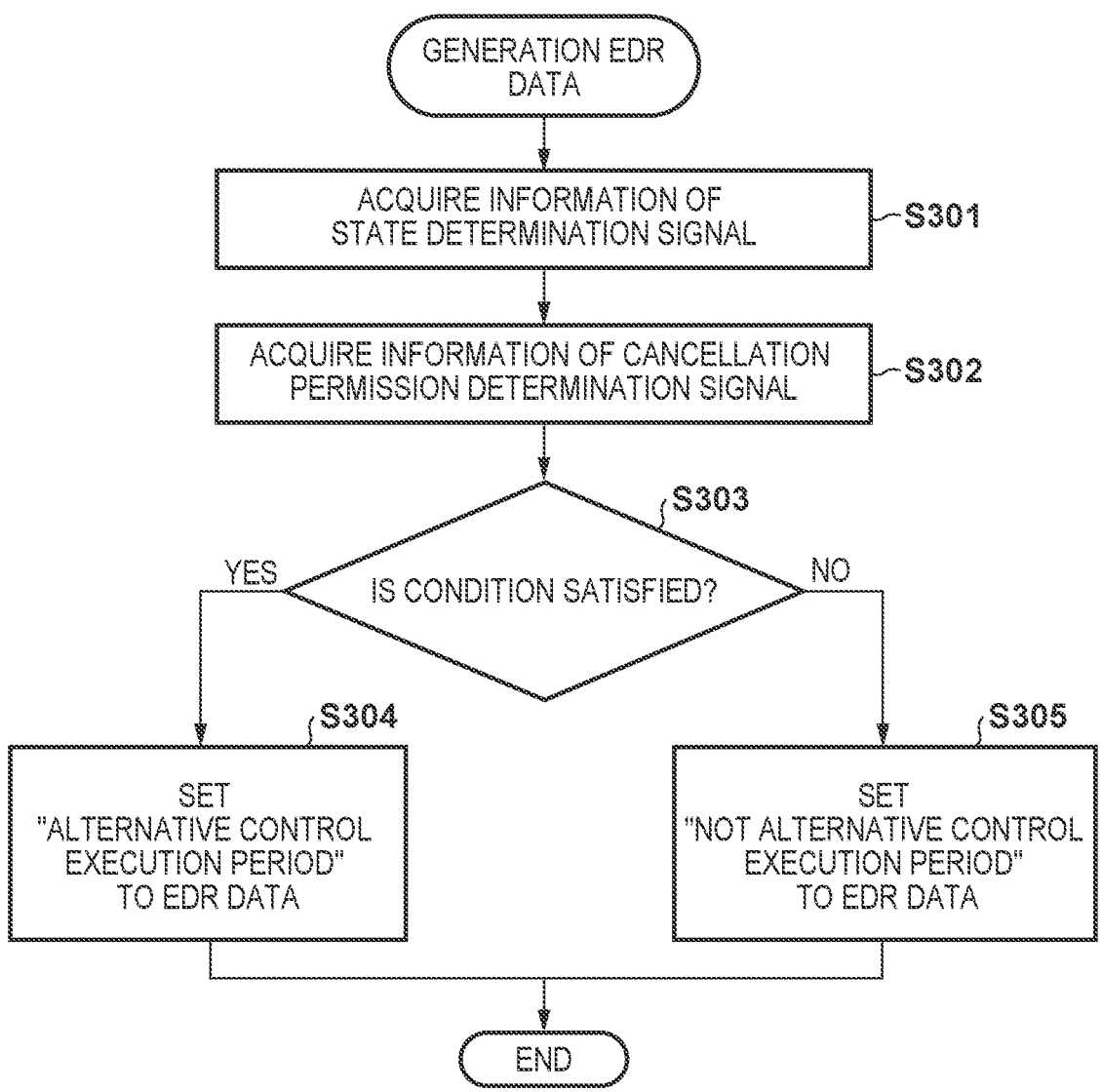
FIG. 11 is a flowchart showing EDR data generation processing.

FIG. 11 is a flowchart showing EDR data generation processing performed by the EDR data generation unit 603. The processing in FIG. 11 is realized by a processor in the first control unit 1A reading out and executing a program stored in a memory such as a ROM, for example.

In step S301, the EDR data generation unit 603 acquires the information indicated by the state determination signal 604, and in step S302, acquires the information indicated by the cancellation permission determination signal 605.

In step S303, the EDR data generation unit 603 determines whether or not the information indicated by the state determination signal 604 acquired in step S301 and the information indicated by the cancellation permission determination signal 605 acquired in step S302 satisfy a condition. The condition here is, for example, that the state determination signal 604 indicates the active state 502 and the cancellation permission determination signal 605 indicates "cancellation prohibited". If it is determined that the condition is satisfied, processing proceeds to step S304, and the EDR data generation unit 603 generates the EDR data 606 in which the content "alternative control execution period" is set, and outputs the generated data to the EDR. If it is determined that the condition is not satisfied, processing proceeds to step S305, and the EDR data generation unit 603 generates the EDR data 606 in which the content "not alternative control execution period" is set, and outputs the generated data to the EDR for recording. After steps S304 and S305, the processing in FIG. 11 ends.

According to the above processing, the information that indicates whether or not alternative control is being executed and this is to be stored in the EDR can be matched with the self-interruption state in the first control unit 1A.

Summary of Embodiment

A vehicle control apparatus according the above embodiment is a vehicle control apparatus including: a first travel control unit (1A) and a second travel control unit (1B) that are configured to perform vehicle travel control by device control, wherein the first travel control unit includes an instruction unit (timing 700 in FIG. 7B) configured to instruct the second travel control unit to execute alternative control, a stop unit (timing 700 in FIG. 7B) configured to stop the device control if execution of the alternative control was instructed by the instruction unit, a reception unit (S103, S104) configured to receive information regarding an execution status of the alternative control from the second travel control unit, and a determination unit (S105) configured to determine whether the stopping of the device control by the stop unit is to be cancelled, based on the information regarding the execution status of the alternative control that was received by the reception unit.

According to this configuration, it is possible to make a determination to cancel self-interruption based on the execution status of alternative control.

Also, the determination made by the determination unit is made after a predetermined time (704 in FIG. 7B) has elapsed since execution of the alternative control was instructed by the instruction unit.

According to this configuration, it is possible to prevent self-interruption from being cancelled even though alternative control is being executed by the second travel control unit.

Also, the vehicle control apparatus further includes an acquisition unit (S206) configured to acquire information indicating that the alternative control is being executed from the information regarding the execution status of the alternative control that was received by the reception unit. Further, the acquisition unit acquires the information after the predetermined time has elapsed since execution of the alternative control was instructed by the instruction unit (S202).

According to this configuration, it is possible to appropriately acquire the execution status of alternative control in the second travel control unit.

Also, the vehicle control apparatus further includes an output unit (603) configured to output, to a recording unit, event information regarding the alternative control, based on the information that was received by the acquisition unit and indicates that the alternative control is being executed, and based on a determination result from the determination unit. Further, the determination result indicates that the stopping of the device control by the stop unit is not to be cancelled.

According to this configuration, information indicating that alternative control is being executed by the second travel control unit can be recorded in an EDR, for example.

Also, the reception unit receives the information regarding the execution status of the alternative control via a plurality of communication media.

According to this configuration, information regarding the execution status of alternative control in the second travel control unit can be received over Ethernet and a CAN, for example, Also, the vehicle control apparatus further includes a setting unit (602) configured to set whether or not the stopping of the device control by the stop unit is to be cancelled, based on first information that was received by the reception unit via a first communication medium among the plurality of communication media and second information that was received by the reception unit via a second communication medium among the plurality of communication media, wherein the determination made by the determination unit is made in accordance with the setting performed by the setting unit.

According to this configuration, it is possible to appropriately acquire the execution status of alternative control in the second travel control unit even if the communication speed is different between the first communication medium and the second communication medium.

The invention is not limited to the foregoing embodiments, and various variations/changes are possible within the spirit of the invention.

What is claimed is:

1. A vehicle control apparatus comprising:
a first control unit and a second control unit that are configured to perform vehicle travel control by device control and communicate with each other via a first communication path and a second communication path, and the first control unit is configured to control a first actuator group as the device control and the second control unit is configured to control a second actuator group as the device control,
wherein the first control unit, which executes instructions stored in at least one memory, being configured to:
hand over control authority to the second control unit by instructing the second control unit to execute the device control as alternative control, if any of the first actuator group is in a malfunction,
stop control of the first actuator group when execution of the alternative control is instructed,
receive information regarding an execution status of the alternative control from the second control unit via each of the first communication path and the second communication path, and
determine whether the stopping of control of the first actuator group is to be cancelled, based on the information regarding the execution status of the alternative control received via the first communication path and the information regarding the execution status of the alternative control received via the second communication path, and
cancel the stopping of control of the first actuator group to return the control authority to the first control unit, if it is determined that the stopping of control of the first actuator group is to be cancelled,
wherein the determination whether the stopping of the device control is to be cancelled is restricted not to be performed for a predetermined time after the execution of the alternative control is instructed, and the predetermined time includes a transmission time of the information regarding the execution status of the alternative control received via each of the first and second communication paths.

2. The vehicle control apparatus according to claim 1, wherein the determination is made after a predetermined time has elapsed since execution of the alternative control was instructed.

3. The vehicle control apparatus according to claim 2, wherein the first control unit is further configured to:
acquire information indicating that the alternative control is being executed from the received information regarding the execution status of the alternative control.

4. The vehicle control apparatus according to claim 3, wherein the first control unit acquires the information indicating that the alternative control is being executed after the predetermined time has elapsed since execution of the alternative control was instructed.

5. The vehicle control apparatus according to claim 3, wherein the first control unit is further configured to:
output, to a recording unit, event information regarding the alternative control, based on the received information indicating that the alternative control is being executed, and based on a determination result of the determination.

6. The vehicle control apparatus according to claim 5, wherein the determination result indicates that the stopping of control of the first actuator group is not to be cancelled.

7. A non-transitory computer-readable storage medium storing a program for causing a vehicle control apparatus, which includes a first control unit and a second control unit that are configured to perform vehicle travel control by device control and communicate with each other via a first communication path and a second communication path, and the first control unit is configured to control a first actuator group as the device control and the second control unit is configured to control a second actuator group as the device control, the first control unit, which executes instructions stored in at least one memory, being configured to:
hand over control authority to the second control unit by instructing the second travel control unit to execute the device control as alternative control, if any of the first actuator group is in a malfunction;
stop control of the first actuator group when execution of the alternative control is instructed;
receive information regarding an execution status of the alternative control from the second travel control unit via each of the first communication path and the second communication path; and
determine whether the stopping of control of the first actuator group is to be cancelled, based on the received information regarding the execution status of the alternative control received via the first communication path and the information regarding the execution status of the alternative control received via the second communication path, and
cancel the stopping of control of the first actuator group to return the control authority to the first control unit, if it is determined that the stopping of control of the first actuator group is to be cancelled,
wherein the determination whether the stopping of he device control is to be cancelled is restricted not to be performed for a predetermined time after the execution of the alternative control is instructed, and the predetermined time includes a transmission time of the information regarding the execution status of the alternative control received via each of the first and second communication paths.

8. The vehicle control apparatus according to claim 1, further comprising:
a setting unit configured to set whether or not the stopping of the device control is to be cancelled, based on the received information via the first communication path and the received information via the second communication path,
wherein the determination is made in accordance with the setting.

9. A vehicle control method executed in a vehicle control apparatus that includes a first control unit and a second control unit that are configured to perform vehicle travel control by device control and communicate with each other via a first communication path and a second communication path, and the first control unit is configured to control a first actuator group as the device control and the second control unit is configured to control a second actuator group as the device control, the first control unit and the second control unit configured to execute instructions stored in at least one memory, the vehicle control method comprising:
the first control unit hands over control authority to the second control unit by instructing the second control unit to execute the device control as alternative control, if any of the first actuator group is in a malfunction;
the first control unit stopping control of the first actuator group when execution of the alternative control is instructed;
the first control unit receiving information regarding an execution status of the alternative control from the second travel control unit via each of the first communication path and the second communication path; and
the first control unit determining whether the stopping of control of the first actuator group is to be cancelled, based on the received information regarding the execution status of the alternative control received via the first communication path and the information regarding the execution status of the alternative control received via the second communication path, and
cancel the stopping of control of the first actuator group to return the control authority to the first control unit, if it is determined that the stopping of control of the first actuator group is to be cancelled,
wherein the determination whether the stopping of the device control is to be cancelled is restricted not to be performed for a predetermined time after the execution of the alternative control is instructed, and the predetermined time includes a transmission time of the information regarding the execution status of the alternative control received via each of the first and second communication paths.

* * * * *